US010061943B2

(12) United States Patent
Vieira et al.

(10) Patent No.: US 10,061,943 B2
(45) Date of Patent: Aug. 28, 2018

(54) KEYBOARD MONITORING TO PROTECT CONFIDENTIAL DATA

(71) Applicant: GAS Informatica LTDA, Vila Leopoldiona (BR)

(72) Inventors: Juliano Galhiego Vieira, Volta Redonda (BR); Silvio Reis, Jr., Volta Redonda (BR); Rodrigo Antonio de Araujo, Volta Redonda (BR); Rafael Ribeiro Homem D'el-Rey, Indaiatuba, SP (BR)

(73) Assignee: GAS Informatica LTDA, Vila Leopoldiona (BR)

( * ) Notice: Subject to any disclaimer, the term of this patent is extended or adjusted under 35 U.S.C. 154(b) by 0 days.

(21) Appl. No.: 14/957,028

(22) Filed: Dec. 2, 2015

(65) Prior Publication Data
US 2017/0161525 A1 Jun. 8, 2017

(51) Int. Cl.
*G06F 21/83* (2013.01)
*G06F 21/62* (2013.01)
*H04L 29/06* (2006.01)
*G06F 21/55* (2013.01)

(52) U.S. Cl.
CPC ............ *G06F 21/83* (2013.01); *G06F 21/552* (2013.01); *G06F 21/6218* (2013.01); *G06F 21/6245* (2013.01); *H04L 63/101* (2013.01); *H04L 63/1483* (2013.01); *G06F 2221/2101* (2013.01); *G06F 2221/2119* (2013.01)

(58) Field of Classification Search
CPC .............. G06F 21/83; G06F 21/6218; G06F 2221/2101; G06F 2221/2119; H04L 63/101; H04L 63/1483

USPC ............................................. 726/26, 27, 30
See application file for complete search history.

(56) References Cited

U.S. PATENT DOCUMENTS

| | | | |
|---|---|---|---|
| 8,117,665 B2 * | 2/2012 | Kawabuchi | G06F 21/608 726/26 |
| 2005/0012911 A1 * | 1/2005 | Cambron | G03B 21/26 353/122 |
| 2007/0006305 A1 | 1/2007 | Florencio et al. | |
| 2009/0178116 A1 * | 7/2009 | Nagoya | G06Q 10/10 726/3 |
| 2011/0113427 A1 | 5/2011 | Dotan | |

(Continued)

OTHER PUBLICATIONS

SAFE: A social based updatable filtering protocol with privacy-preserving in mobile social networks, Zhang et al, IEEE 2013, 10.1109/ICC.2013.6655568.*

(Continued)

*Primary Examiner* — Jahangir Kabir
(74) *Attorney, Agent, or Firm* — Black, McCuskey, Souers & Arbaugh, LPA (57) ABSTRACT

In an example embodiment described herein, keyboard monitoring logic is operable to obtain data typed into a keyboard. The data typed into the keyboard is compared with predefined protected data stored in a local credential file. If data typed into the keyboard matches predefined protected data stored in the credential file, the keyboard monitoring logic determines whether the destination of the typed data (e.g., the application, website, or both the application and website are stored in a whitelist. If the destination is not stored in the whitelist, the keyboard monitoring logic determines that an attempt of unauthorized access to protected data is occurring.

17 Claims, 4 Drawing Sheets

(56) References Cited

U.S. PATENT DOCUMENTS

| | | | | |
|---|---|---|---|---|
| 2011/0219302 A1* | 9/2011 | Kondo | ............... | G06F 3/0416 |
| | | | | 715/702 |
| 2012/0331539 A1* | 12/2012 | Matsugashita | .......... | G06F 21/41 |
| | | | | 726/9 |
| 2015/0026626 A1* | 1/2015 | Yokoyama | .......... | G06F 3/04886 |
| | | | | 715/773 |
| 2016/0182539 A1* | 6/2016 | Edwards | ............ | H04L 63/1416 |
| | | | | 726/23 |

OTHER PUBLICATIONS

A social based updatable filtering protocol with privacy-preserving in mobile social networks, Zhang et al, IEEE 2013, (Year: 2013).*

Zhang Xu, Haining Wang, and Sushil Jajodia; Gemini: An Emergency Line of Defense against Phishing Attacks; 2014 IEEE 33rd International Symposium of Reliable Distributed Systems.

Jie Hou and Qi Yang; Defense Against Mobile Phishing Attack; EECS 588 Project; Apr. 2012.

International Search Report and Written Opinion of International Searching Authority for corresponding PCT application.

* cited by examiner

KEYBOARD MONITORING TO PROTECT CONFIDENTIAL DATA

TECHNICAL FIELD

The present disclosure relates generally to protecting personal data.

BACKGROUND

Phishing attacks are frequently employed to obtain confidential user information. Some variations of phishing attacks involve sending an email with a link to a website that appears to be a legitimate website seeking protected personal data. Another variation of phishing attacks involves a Uniform Resource Location ("URL") that is similar to a legitimate website, which attempts to appear like a legitimate website that would request confidential user information.

BRIEF DESCRIPTION OF THE DRAWINGS

The accompanying drawings incorporated herein and forming a part of the specification illustrate the example embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In an example embodiment described herein, keyboard monitoring logic is operable to obtain data typed into a keyboard. The data typed into the keyboard is compared with predefined protected data stored in a local credential file. If data typed into the keyboard matches predefined protected data stored in the credential file, the keyboard monitoring logic determines whether the destination of the typed data (e.g., the application, website, or both the application and website are stored in a whitelist. If the destination is not stored in the whitelist, the keyboard monitoring logic determines that an attempt of unauthorized access to protected data is occurring.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, there is described herein a keyboard monitoring technology for preventing credential stealing by unauthorized applications or web-sites. When a certain application (such as Internet Banking) is accessed, a parameterized function is called, triggering a procedure that is operable to store predefined user information into a local credential file. The user information (or predefined credentials) may be any information that can identify a user or an account associated with the user, including but not limited to, bank branch, account number, user name, password, or account type. A global keyboard monitor process is created. For example, in the WINDOWS environment, the SetWindowsHookEx, GetKeyState, or any other suitable API (application Programming interface) is employed. The global keyboard monitor process is operable to identify the input of these credentials in websites or programs. Those skilled in the art can appreciate that in particular embodiments not all of the aforementioned predefined credentials are monitored, monitoring may be limited to selectively configured credentials.

The global keyboard monitor process is operable to continually monitor what a user is typing on a keyboard. The global keyboard monitoring logic compares what the user is typing with data stored previously into the local credential file. If the data typed in by the user matches the stored credentials, the global keyboard monitoring logic determines whether the application or web-site where the typed information is being directed is in a predefined safe or white list. If the application is whitelisted, then no action is taken; otherwise, corrective action is taken, such as sending an event with information regarding the typed credentials to a particular server.

Figure 1:
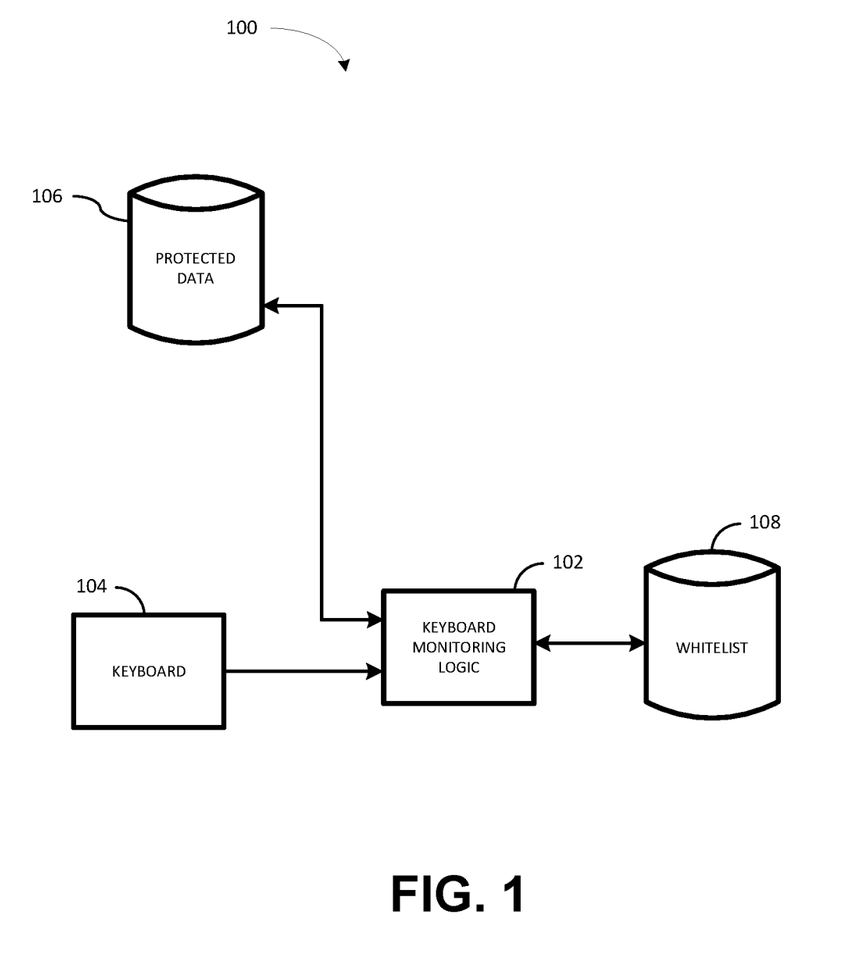
FIG. 1 is a block diagram illustrating an example of a functional diagram of an apparatus operable to detect an attempt of obtaining protected data.

FIG. 1 is a block diagram illustrating an example of a functional diagram of an apparatus 100 operable to detect an unauthorized attempt of obtaining protected data. The apparatus 100 comprises global keyboard monitoring logic 102. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software that performs the desired functionality when executed by a processor.

In an example embodiment, the global keyboard monitoring logic 102 is operable to obtain data typed into a keyboard 104. The global keyboard monitoring logic 102 can obtain the data typed into the keyboard 104 by employing an operating system application programming interface ("API"). For example, in a WINDOWS environment, the SetWindowsHookEx, GetKeyState, or any other suitable API can be employed to obtain data typed into the keyboard 104. Those skilled in the art can readily appreciate that for other operating systems other suitable APIs may be employed.

The global keyboard monitoring logic 102 compares the data typed into the keyboard with predefined protected data stored in a file protected data or "credential" file 106. The predefined protected data can be any type of data. For example, for a financial institution, the protected data may by any one of username, account number, account type, branch information, or any combination of username, account number, account type, and branch information.

Upon determining that the comparison of data typed into the keyboard 104 matches protected data store in the credential file 106, the global keyboard monitoring logic 102 determines whether the destination of the data typed into the keyboard is stored in a whitelist 108. In an example embodiment, the whitelist 108 is a file that can contain data representative of one predefined safe applications, data representative of safe websites, or both data representative of safe applications and data representative of safe websites. If the destination is in the whitelist, then no further action is taken and the data typed into the keyboard is forwarded to the destination; otherwise, one or more predefined actions may be taken. For example, the predefined protective action may include blocking or preventing the data typed in the keyboard from reaching the destination. Another action which may be taken is sending an event with data representative of the protected data and destination to a remote server.

Figure 2:
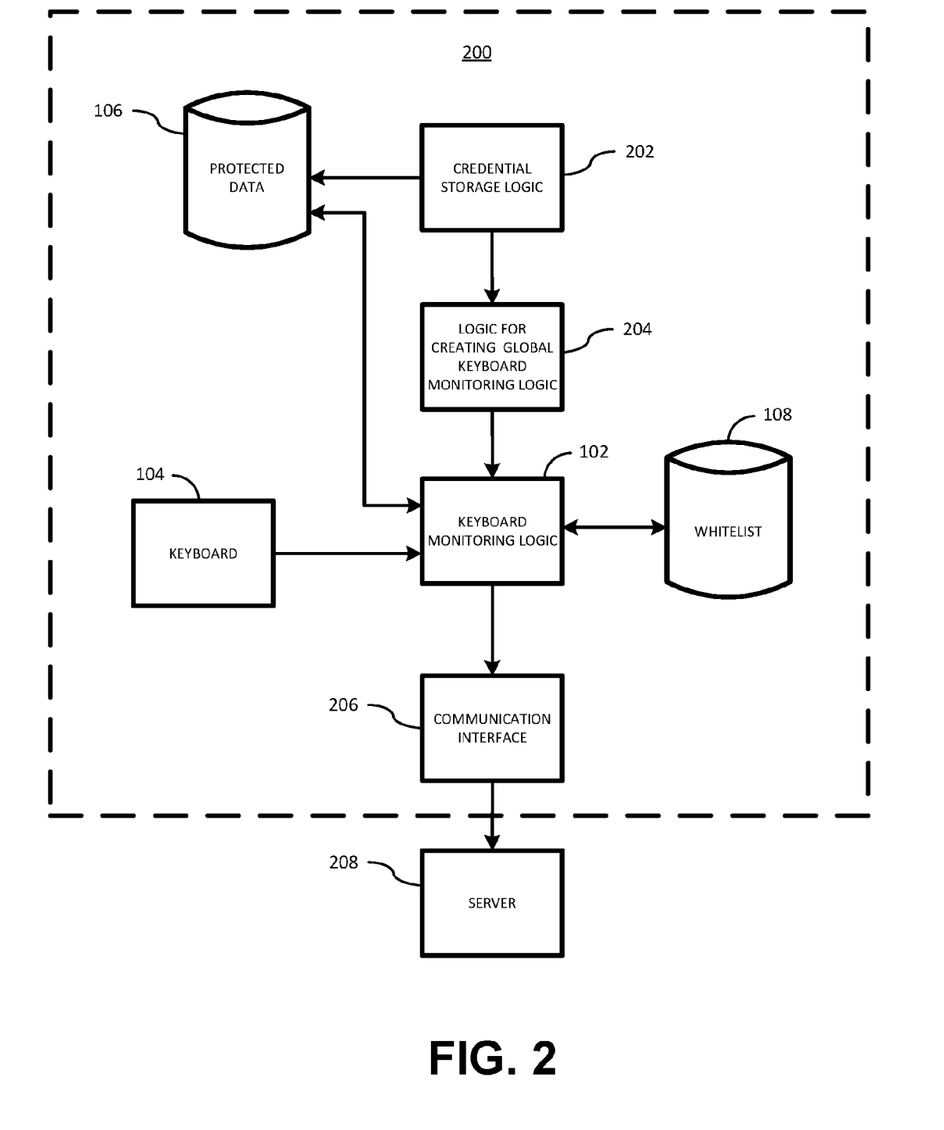
FIG. 2 is a block diagram illustrating a second example of a functional diagram of an apparatus operable to detect an attempt of obtaining protected data.

FIG. 2 is a block diagram illustrating a example of a functional diagram of an apparatus 200 operable to detect an attempt of obtaining protected data. The apparatus 200 comprises the global keyboard monitoring logic 102, keyboard 104, credential file 106, and whitelist 108 as described in FIG. 1. The apparatus 200 further comprises a credential storage logic 202 operable to be selectively activated, and upon activation is operable to obtain the predefined protected data and store the predefined protected data in the credential file 106.

In an example embodiment, the credential storage logic 202 is selectively activated by a client, such as, for example, an Internet Banking application. The credential storage logic 202 obtains data to be protected for the client. For example, in a banking application, the user's username, account number, account type, and branch where account is maintained may be considered confidential or protected, data. Other data may also be collected. Upon collecting the data, the credential storage logic 202 creates the credential file 106 and stores the protected data in the credential file 106.

In particular embodiments, the credential file 106 contains both protected and unprotected data. The credential storage logic 202 selects data in the credential file 106 that is to be protected, and provides data indicating the protected data. The global keyboard monitoring logic 102 compares the data typed into the keyboard 104 against the protected data, and ignores unprotected data.

In an example embodiment, the credential storage logic 202 further comprises logic for creating a global keyboard monitoring logic 204. The credential storage logic 202 is operable create the global keyboard monitoring logic 102 responsive to storing the predefined protected data. For example the global keyboard monitoring logic 102 can be created by employing the WINDOWS SetWindowsHookEx, GetKeyState, or any other suitable API.

In an example embodiment, the apparatus 100 further comprises a communication interface 206 that is coupled with the global keyboard monitoring logic 102. The communication interface 206 enables the global keyboard monitoring logic 102 to send data to a remote sites, such as a remote server 208. For example, upon detecting an unauthorized attempt to acquire protected data, the global keyboard monitoring logic 102 may employ communication interface 206 to send an event with data representative of the data typed into the keyboard 104 and destination to the remote server 208.

Figure 3:
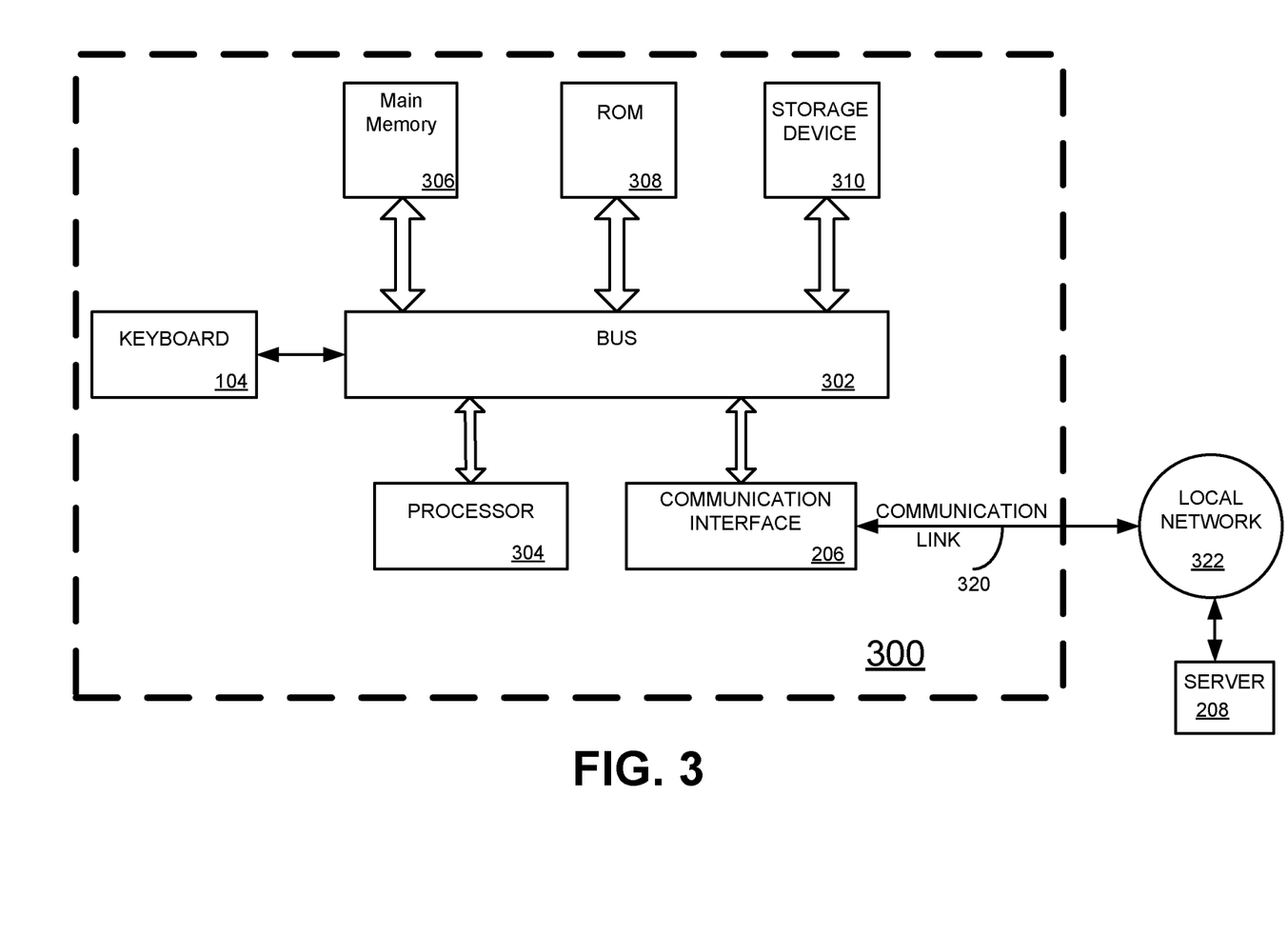
FIG. 3 is a block diagram of a computer system upon which an example embodiment can be implemented.

FIG. 3 is a block diagram of a computer system 300 upon which an example embodiment can be implemented. Computer system 300 may be employed for implementing the global keyboard monitoring logic 102 described in FIGS. 1 and 2, the credential storage logic 202 described in FIG. 2 and/or the Logic for creating the global keyboard monitoring logic 204 described in FIG. 2.

Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions. In an example embodiment, computer system is coupled to a keyboard 104 that may include alphanumeric and other keys. The keyboard 104 may be employed for communicating information and command selections to the processor 304.

An aspect of the example embodiment is related to the use of computer system 300 for detecting unauthorized attempts to access protected data. According to an example embodiment, detecting unauthorized attempts to access protected data is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media. Non-volatile media includes for example optical or magnetic disks, such as storage device 310. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

In an example embodiment, the computer system 300 also includes a communication interface 206 coupled to bus 302. Communication interface 206 provides a two-way data communication coupling computer system 300 to a communication link 320 that is connected to a local network 322. For example, communication interface 206 may be a local area network (LAN) card to provide a data communication connection to a compatible LAN. As another example, communication interface 206 may be an integrated services digital network (ISDN) card or a modem to provide a data communication connection to a corresponding type of telephone line. Wireless links may also be implemented. In any such implementation, communication interface 206 sends and receives electrical, electromagnetic, or optical signals that carry digital data streams representing various types of information.

The communication link 320 typically provides data communication through one or more networks to other data devices. For example, communication link 320 may provide a connection through local network 322 to a remote server 208.

Figure 4:
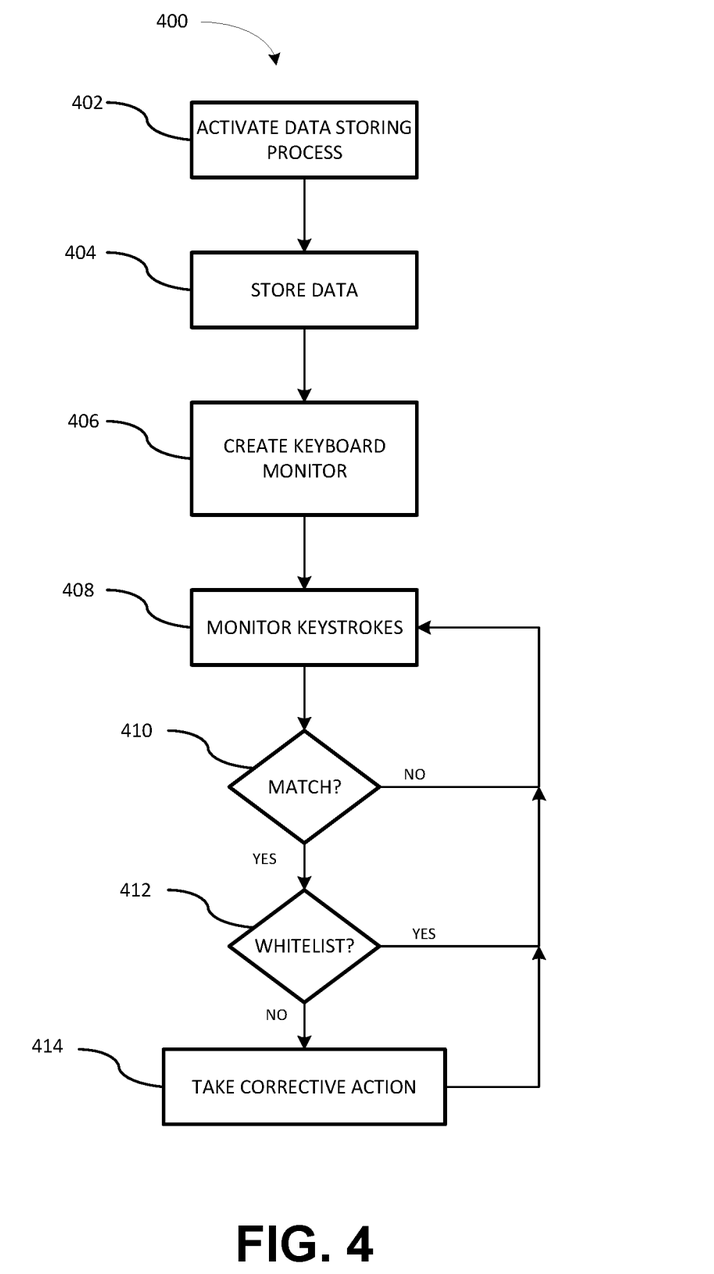
FIG. 4 is a block diagram of a method for detecting an unauthorized attempt at accessing protected data.

In view of the foregoing structural and functional features described above, a methodology 400 in accordance with an example embodiment will be better appreciated with reference to FIG. 4. While for purposes of simplicity of explanation, the methodology 400 of FIG. 4 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an example embodiment. The methodology 400 described herein is suitably adapted to be implemented in hardware, software when executed by a processor, or a combination thereof. For example some actions of the methodology 400 may be implemented by the global keyboard monitoring logic 102 described in FIGS. 1 and 2 while other actions of the methodology 400 may be implemented by the credential storage logic 202 described in FIG. 2. In another example embodiment, the methodology can be implemented on one or more processors such as processor 304 described in FIG. 3.

At 402, a data storing process is activated. For example, the process can be called by a client application. For example, an Internet Banking application can activate the process when a user is inputting information for accessing their accounts, such as, including but not limited to, username, account numbers, account types, and branch information.

At 404, the protected data, such as user data or other confidential data, is stored in a protected data or credential file. In some embodiments, the protected date file can include both protected and unprotected data. The application creating the protected data file may provide an indication for specifying which data is protected data.

Upon storing the data, at 406, a global keyboard monitor process is created. Any suitable technique may be employed for creating the process. For example, the process may be created by employing the SetWindowsHookEx, GetKeyState, or any other suitable API.

Upon creating the global keyboard monitoring process, data typed into a keyboard is continually monitored as indicated by 408. Data typed into the keyboard is compared with protected data store in the protected data file to determine whether the data typed into the keyboard matches predefined protected data in the protected data file as indicated by 410. If the typed data does not match protected data at 410 (NO), the no further action is taken and the keystrokes are still monitored at 408.

If, at 410, a match is found (YES), at 412 a search is made to determine whether the destination of the typed in data is in a whitelist. The whitelist may comprise a list of safe applications, safe websites, or both safe applications and safe websites. If, at 412, the destination is found in the whitelist (YES), no further action is taken and keystroke monitoring continues at 408.

If, at 412, the destination Is not in the whitelist (NO), corrective action is taken as indicated by 414. The corrective action may include, but is not limited to, preventing the keystrokes from reaching the destination, sending an event with data representative of the typed data and destination to a server, providing an alert to a user that an unauthorized attempt at acquiring protected data has occurred, or any combination of the aforementioned actions.

To illustrate by way of example, the response to three sets of keystroke data will be described. The first set is unprotected data, the second set is protected data that is destined for a whitelisted destination, and the third set is protected data destined to a destination that is not whitelisted. Although the sequences are described as first data, second data, and third data, those skilled in the art should readily appreciate that the keystroke data may arrive in any order and that the number of sets of keystroke data were selected merely for ease of illustration and that any physically realizable sets of keystrokes may be processed by method 400.

At 408 keystrokes are monitored and data representative of a first data typed into the keyboard is acquired. At 408, the first data is compared with the predefined protected data. At 410, no match is found (NO), so the data is allowed to pass to the destination and no further action is taken on the first data. Keystroke monitoring continues at 408.

At 408, second data typed into the keyboard is acquired. At 410, the second data is compared with the predefined protected data. In response to finding a match (YES), at 412, a search is made to determine whether the destination is listed on a whitelist. At 412, the destination for the second data is found (YES) so no further action needs to be taken and the second data can be allowed to pass to the destination. Keystroke monitoring continues at 408.

At 408, the third set of keystrokes (third data) are obtained. At 410, a comparison of the third data is made with the predefined protected data. The comparison reveals that third data matches predefined protected data (YES), so the a search of a whitelist file made at 412 to determine whether the destination for the third data is an approved destination for the protected data.

At 412, a determination is made that the destination for the third data is not on the whitelist (NO). Consequently, at 414 corrective action as described herein is taken.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a credential file storing predefined protected data;
a whitelist file comprising data representative of predefined safe applications;
a keyboard;

7 at least one hardware processor; and a global keyboard monitoring logic when execute by the at least one hardware processor configures the one or more hardware processor to:

obtain data typed into the keyboard destined to a local application;

compare first data typed into the keyboard for a first local application with the predefined protected data stored in the credential file, wherein the first data is a complete data set submitted to the first local application and is obtained from a first set of a plurality of keystrokes;

determine whether the first local application is in the whitelist file responsive to determination that the first data matches a predefined protected data stored in the credential file;

determine an attempt at unauthorized access to protected data is occurring responsive to determination that the first data typed into the keyboard matches the predefined protected data stored in the credential file and determination that the first local application is not in the whitelist file;

prevent the first data from reaching the first application responsive to the determination that the first data typed into the keyboard matches the predefined protected data stored in the credential file and the determination that the first local application is not in the whitelist file;

compare second data typed into the keyboard that is destined for the first local application with the predefined protected data stored in the credential file, wherein the second data is a complete data set submitted to the first local application and is obtained from a second set of a plurality of keystrokes;

allow the second data to be forwarded to the first second local application responsive to a determination that the second data does not match predefined protected data stored in the credential file;

compare third data typed into the keyboard for a second local application with the predefined protected data stored in the credential file, wherein the third data is a complete data set submitted to the second local application and is obtained from a third set of a plurality of keystrokes;

determine whether the second local application is in the whitelist file responsive to determination that the third data matches a predefined protected data stored in the credential file; and allow the third data to be forwarded to the second local application responsive to a determination that the third data typed into the keyboard matches a predefined protected data and a determination that the second local application is in the whitelist file.

2. The apparatus set forth in claim 1, further comprising a credential storage logic is selectively activated, and upon activation causes the predefined protected data to be stored in the credential file.

3. The apparatus set forth in claim 2, wherein the credential storage logic creates the keyboard monitoring logic responsive to storing the predefined protected data.

4. The apparatus set forth in claim 2, wherein the credential storage logic creates the global keyboard monitoring logic.

5. The apparatus set forth in claim 4, wherein the credential storage logic creates the global keyboard monitoring logic responsive to storing the predefined user credentials.

6. The apparatus set forth in claim 2, wherein the credential storage logic creates the local credential file.

8

7. The apparatus set forth in claim 1, wherein the predefined protected data comprises user data.

8. The apparatus set forth in claim 7, wherein the user data further comprises data representative of a financial account associated with the user data.

9. The apparatus set forth in claim 8, wherein the user data comprises one of a group consisting of a username, an account number, an account type, and data representative of a branch associated with a user account.

10. The apparatus set forth in claim 9, wherein the credential storage logic selectively indicates which of the stored predefined protected data to monitor.

11. The apparatus set forth in claim 1, wherein the whitelist file comprises data representative of predefined safe local applications.

12. The apparatus set forth in claim 1, further comprising:

a communication interface; and wherein the keyboard monitoring logic sends an event with data representative of the typed credentials and destination to a particular server responsive to determining an attempt at unauthorized access to protected data is occurring.

13. A non-transitory tangible computer readable medium with instructions encoded thereon for execution by a processor, and when executed perform:

monitoring data typed into a keyboard;

comparing the data typed into the keyboard with predefined protected data, wherein the first data is a complete data set submitted to the first local application and is obtained from a first set of a plurality of keystrokes;

determining whether a first local application is in a whitelist file responsive to the comparison of a first data typed into the keyboard with predefined protected data indicating the data typed into the keyboard is predefined protected data;

determining that an attempt at unauthorized access to protected data is occurring responsive to the comparison of the first data typed into the keyboard with predefined protected data indicating the first data typed into the keyboard is predefined protected data and the first local application is not in the whitelist file;

determining an attempt at unauthorized access to protected data is occurring responsive to determination that the first data typed into the keyboard matches a predefined protected data and to determination that the first local application data is not in the whitelist file;

preventing the first data from reaching the first local application responsive to determining that the first data is predefined protected data and the first local application is not in the whitelist file:

comparing second data typed into the keyboard that is destined for the first local application with the predefined protected data stored in the credential file, wherein the second data is a complete data set submitted to the first local application and is obtained from a second set of a plurality of keystrokes:

allowing the second data to be sent to the first local application responsive to determining that the second data is not predefined protected data stored in the credential file:.

comparing third data typed into the keyboard that is destined for a second local application with the predefined protected data stored in the credential file, wherein the third data is a complete data set submitted to the second local application and obtained from a third set of a plurality of keystrokes;

determining whether the second destination application of the third data typed into the keyboard is in the whitelist file responsive to determining that the third data typed into the keyboard matches a predefined protected data stored in the credential file; and allowing the third data to be forwarded to the second local application responsive to determining that the third data typed into the keyboard matches a predefined protected data stored in the credential file and determining that the second local application is in the whitelist file.

14. The computer readable medium of claim 13, the instructions further comprises instructions to send an event with data representative of the data typed into the keyboard to a predefined server.

15. The computer readable medium of claim 13 wherein the whitelist file further comprises data representative of safe applications, safe websites, and both safe applications and safe websites.

16. The computer readable medium of claim 13, wherein the protected data comprises user data associated with a financial institution, the user data selected from a group consisting of data representative of username, data representative of account number, data representative of a branch, data representative of an account type.

17. A method, comprising:
monitoring data typed into a keyboard;
comparing first data typed into the keyboard with predefined protected data, wherein the first data is a complete data set submitted to the first local application and a is obtained from a first set of a plurality of keystrokes;
determining whether a first data typed into the keyboard for a first local application is in a whitelist file responsive to the comparison of the first data typed into the keyboard with predefined protected data indicating the data typed into the keyboard is predefined protected data;
determining that an attempt at unauthorized access to protected data is occurring responsive to the comparison of the first data typed into the keyboard with predefined protected data indicating the first data typed into the keyboard is predefined protected data and the first local application is not in the whitelist file;
preventing the first data from reaching the first local application responsive to determining that the first data is protected data and the first local application is not in the whitelist file;
comparing second data typed into the keyboard that is destined for the first local application with the predefined protected data stored in the credential file, wherein the second data is a complete data set submitted to the first local application and is obtained from a second set of a plurality of keystrokes;
allowing the second data to be sent to the first local application responsive to determining that the second data is not predefined protected data stored in the credential file;
comparing third data typed into the keyboard that is destined for a second local application with the predefined protected data stored in the credential file, wherein the third data is a complete data set submitted to the second local application and is obtained from a third set of a plurality of keystrokes;
determining whether the second local application is in the whitelist file responsive to determining that the third data typed into the keyboard matches a predefined protected data stored in the credential file; and
allowing the third data to be forwarded to the second local application responsive to determining that the third data typed into the keyboard matches a predefined protected user data and determining that the second local application is in the whitelist file.

* * * * *